No. 863,359. PATENTED AUG. 13, 1907.
N. J. CLUTE.
BRAKE.
APPLICATION FILED APR. 23, 1907.
2 SHEETS—SHEET 1.
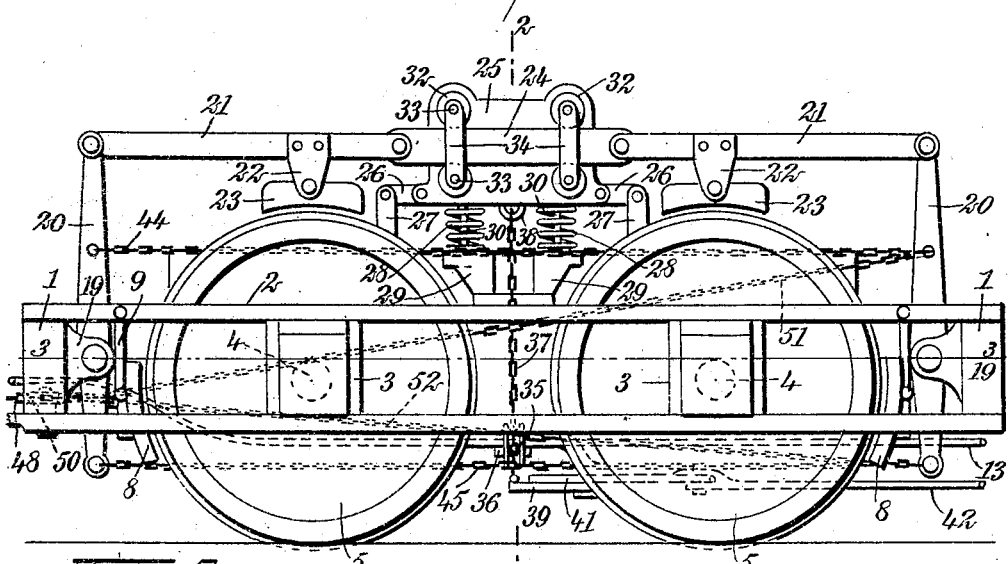
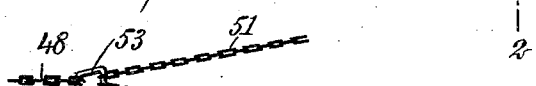
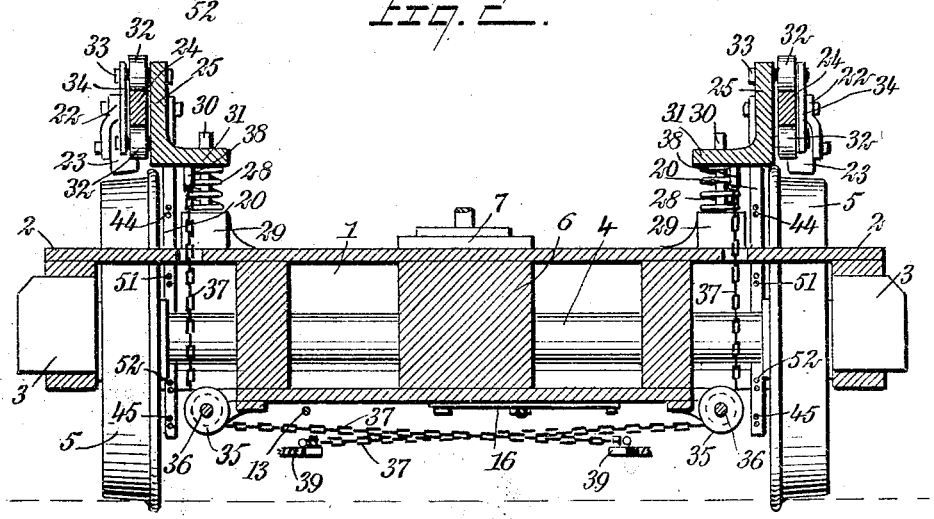
WITNESSES
H. Walker
John K. Blackwood
INVENTOR
Nicholas J. Clute
BY Munn & Co
ATTORNEYS No. 863,359. PATENTED AUG. 13, 1907.
N. J. CLUTE.
BRAKE.
APPLICATION FILED APR. 23, 1907.
2 SHEETS—SHEET 2.
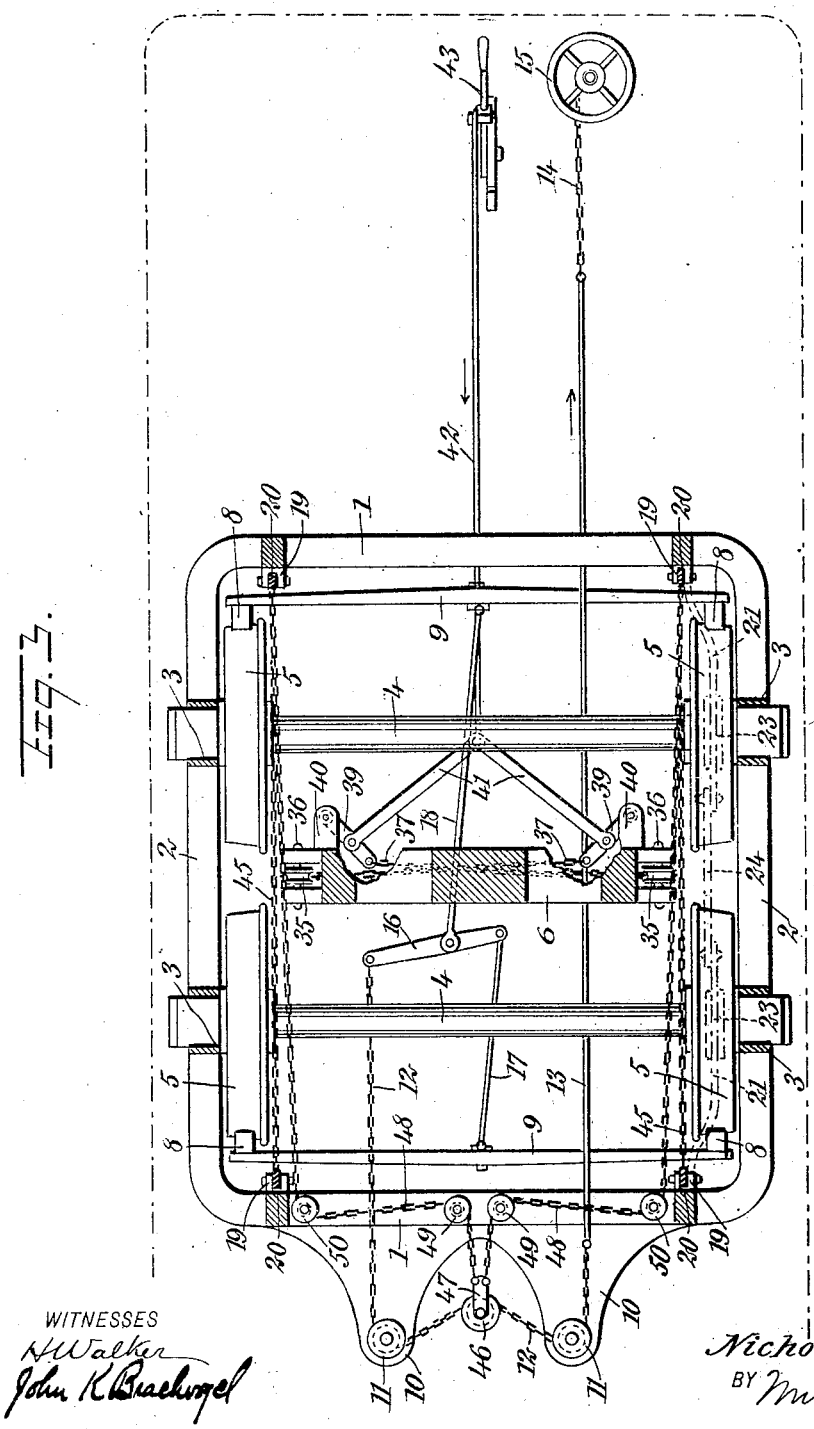
WITNESSES
H. Walker
John K. Brackegel
INVENTOR
Nicholas J. Clute
BY Munn & Co
ATTORNEYS

UNITED STATES PATENT OFFICE.

NICHOLAS J. CLUTE, OF SCHENECTADY, NEW YORK.

BRAKE.

No. 863,359.

Specification of Letters Patent.

Patented Aug. 13, 1907.

Application filed April 23, 1907. Serial No. 369,832.

*To all whom it may concern:*

Be it known that I, NICHOLAS J. CLUTE, a citizen of the United States, and a resident of Schenectady, in the county of Schenectady and State of New York, have invented a new and Improved Brake, of which the following is a full, clear, and exact description.

This invention relates to brakes, and it is particularly useful in connection with devices of this class used upon railway or other cars.

The object of the invention is to provide a simple, strong and efficient brake, which can be manually controlled and which utilizes the movement of the wheels to set the brake.

A further object of the invention is to provide a brake which can be easily manually operated by means of the ordinary lever or hand-crank, and which provides means in case of emergency for applying the movement of the wheels for setting the brake instantly.

A still further object of the invention is to provide a brake in which the movement of the wheels can be utilized for setting the brake instantly in case of emergency, as well as for setting the brake gradually and smoothly in the ordinary operation of railway-cars and the like.

The invention consists in the construction and combination of parts to be more particularly described hereinafter and fully set forth in the claims.

Reference is to be had to the accompanying drawings in which

Figure 1 is a side elevation of a railway truck showing my brake applied thereto; Fig. 2 is a vertical cross-section on the line 2—2 of Fig. 1; Fig. 3 is a horizontal cross-section on the line 3—3 of Fig. 1; and Fig. 4 is a side view of a detail.

Like characters of reference designate corresponding parts in all the views.

Before proceeding to a more detailed explanation it should be understood that in connection with the brake of my invention I employ the usual hand-brake comprising the brake shoes, brake beams, equalizer, and brake rods of ordinary construction. In addition, I provide brake shoes adapted to be forced against the wheels, each having a limited movement in the plane of the wheel so that the friction between the wheels and the brake shoes displaces the same. The displacement of the auxiliary brake shoes actuates an intermediate mechanism between these auxiliary brake shoes and the hand brake shoes to operate the latter so that these are converted into power brakes applied by the rotation of the wheels themselves. It will be evident that it requires the expense of slight power only, to apply the auxiliary brake shoes instantly and powerfully, to operate the hand brake shoes. At the same time, the hand brakes can be used as such, independently of the auxiliary brake.

Referring more particularly to the drawings, 1 represents the end pieces of a truck for railroad or other cars, and 2 the side pieces, provided with the usual journal-boxes 3. Carried in the journal-boxes 3, are axles 4 having the wheels 5 rigid therewith and between the side pieces 2. The truck also includes the usual transverse truck bolster 6 near the center of the truck and provided with a truck center plate 7 of the usual form. The wheels 5 are provided with the usual hand brake shoes 8 connected by brake beams 9. At one end, the truck frame end piece 1 has extensions 10 carrying rotatable grooved guide wheels 11. A flexible member, preferably a chain, 12 passes over the guide wheels 11 and is secured at one end to a hand brake rod 13 extending longitudinally of the car and adapted to be manually operated in the usual manner by means of a brake chain 14 and a hand wheel 15.

It will be understood that any preferred or common means for manually operating the hand brake rod may be employed. I provide an equalizer for the hand brake, comprising a lever 16 secured at one end to the extremity of the flexible member 12 and having at the other end a pivotal connection with a link 17 pivotally carried by a brake beam 9. A second link 18 is pivotally mounted between the extremities of the lever 16, having an end pivotally secured to the opposite brake beam 9. It will be understood that when the brake rod 13 is moved longitudinally of the car towards the operator at the hand wheel, the flexible member 12 operates the lever 16 which exerts a quick pull upon the brake beam by means of the links 17 and 18, thereby forcing the brake shoes against the wheels.

Pivoted in suitable brackets 19 carried by the end pieces of the truck are substantially vertical levers 20 adjacent to the wheels at both sides of the truck. The levers 20 extend upwardly and carry pivoted members 21 provided with brake shoe brackets 22 and brake shoes 23. A link 24 forms a pivotal connection between the ends of the links of the opposite levers at each end of the truck. It will be understood that as the levers 20 are pivoted to swing substantially in the plane of rotation of the wheels, and as the members 21 and the link 24 connecting them are pivotally joined, the brake shoes 23 can be moved towards the wheels and at the same time are free to move in the plane of rotation. I provide a pull plate 25 carried upon the truck by means of links 26 pivoted to the pull plate and extensions 27 of the truck. The pull plate is thus free to move in a substantially vertical direction. Helical springs 28 rest against rigid blocks 29 carried by the truck bolster and engage laterally disposed extensions 31 of the pull plate, normally to force the same upwards away from the truck and the wheels. The helical springs 28 are held in position by means of pins 30 carried by the blocks 29, and passing through suitable openings in the extensions 31 of the pull plate. Each pull plate is provided with guide roller 32 carried upon rigid pins 33 and serving to guide the link 24 upon the pull plate. Straps 34 are mounted upon adjacent pins 33 to prevent the lateral displacement of the link 24 from the pull plate. It will be understood that by means of the pull plate, the link 24 and the members 21 can be disposed towards the wheels to force the brake shoe 23 into engagement with the same, while at the same time the members 22 are free to move longitudinally of the truck, the link 24 sliding against the face of the pull plate between the guide rollers. Carried in suitable recesses near each end of the truck bolster are vertically grooved guide wheels 35 mounted upon pivot pins 36 carried by the truck bolster. Flexible members 37, preferably chains, are secured at one end to suitable eyes 38 carried by the pull plate. The flexible members 37 pass under the guide wheels 35 and have their opposite ends secured to levers 39 pivotally mounted upon extensions 40 carried by the truck bolster at the side of the truck opposite to the pull plate to which the respective chains are connected. The levers 39 are joined by a toggle 41 secured at its middle joint to an auxiliary brake rod 42. The auxiliary brake rod is pivotally joined to a hand lever 43 adapted to be held in a plurality of positions in the usual manner. It will be understood that the means for manually operating the auxiliary brake rod 42 may be of any preferred or common type.

With the means shown in Fig. 3, the brake rod 42 is forced towards the truck by means of the hand lever to operate the auxiliary brake, the toggle being spread to force the levers 39 outward, thereby exerting a downward pull upon the chains 37 and forcing the pull plate towards the wheels to effect the engagement of the brake-shoes 23 with the rims of the wheels.

Connecting the opposite levers 20 at the ends of the truck are flexible members 44 and 45 having their ends secured to the levers 20 at points equi-distant from the pivot points of the levers and at opposite sides of the latter. The flexible members 44 and 45 act as links joining the levers, so that the movements of the levers about their pivots are substantially equal and parallel in all cases. A grooved guide wheel 46 is carried free to move by the chain 12 between the guide wheels 11. The guide wheel 46 has a pivoted yoke 47 to which are secured the ends of flexible members 48, preferably chains, passing over grooved guide wheels 49 and 50 mounted upon the end piece 1 of the truck. Flexible members 51 and 52, preferably chains, are secured to each of the levers 20 at the end of the truck opposite to that which carries the guide wheels 49 and 50, and to which the pulley 46 is adjacent. The flexible members 51 and 52 are secured to the levers 20 at the points at which the flexible members 44 and 45 are mounted. The flexible members 51 and 52 at each side of the truck are secured to shackles 53 which in turn are secured to the flexible members 48. The arrangement is such that when the levers 20 are swung about their pivots, either the flexible member 51 or the flexible member 52 exerts a pull upon the flexible members 48, whereby the flexible member 12 between the guide pulleys 11 is forced towards the truck, the levers 16 being operated to set the brake shoes against the wheels 5.

The operation of my invention is as follows: To bring a car to a stop gradually and without jar the ordinary hand brake mechanism may be employed, or the auxiliary brake mechanism which requires the expenditure of less force to operate may be used. In the latter case the hand lever 43 is pulled towards the truck and the brake shoes 23 are thereby forced against the wheels. The movement of the wheels advances the brake shoes 23 in the direction of rotation of the wheels owing to the friction between the contiguous surfaces. The movement of the brake shoes is transmitted through the members 21 to the levers 20 which are swung about their pivots. The movement of the levers 20 depending upon the direction of movement of the car, exerts a pull upon either the flexible member 51 or the flexible member 52, thereby operating the hand brake mechanism through the flexible member 12 and the equalizer. By alternately forcing the auxiliary brake shoes into contact with the wheels and releasing them, the car can be brought to a gradual stop without difficulty. In case of emergency, the car can be brought to a sudden stop by throwing the hand lever 43 into an extreme position to force the brake shoes 23 tightly against the wheels and thus throw the brake shoes 8 into powerful operation against the wheels 5.

It should be understood that I do not limit myself to the particular form of construction as shown in the drawings as it is necessary to change the levers, chains, links, and other parts of the mechanism in order to conform to the various types and kinds of trucks in use; but the principle of my invention remains the same and the changes mentioned do not form any part of the invention.

Having thus described my invention I claim as new, and desire to secure by Letters Patent:—

1. A brake, comprising a brake shoe for engaging a wheel and adapted to be manually operated, a second brake shoe for engaging a wheel and adapted to be manually operated, said second brake shoe being free to move, and means controlled by the movement of said second brake shoe for operating said first brake shoe.

2. A brake, comprising a brake shoe adapted to be manually operated, a second brake shoe adapted to be manually operated, said second brake shoe being free to move and adapted to be controlled by the movement of the wheel, and means controlled by the movement of said brake shoe, for operating said first brake shoe.

3. A brake, comprising a brake shoe adapted to be manually operated, a second brake shoe adapted to be manually operated, said second brake shoe being free to move in the direction of rotation of the wheel and adapted to be controlled by the movement of the wheel, and means controlled by the movement of said second brake shoe for operating said first brake shoe.

4. A brake, comprising a brake shoe adapted to be manually operated, a second brake shoe adapted to be manually operated, said second brake shoe being free to move in the direction of rotation of the wheel and adapted to be advanced by the movement of the wheel, means controlled by the movement of said second brake shoe for operating said first brake shoe, and means for holding said second brake shoe in a normal position out of engagement with the wheel.

5. A brake, comprising a brake shoe adapted to be manually operated, a second brake shoe adapted to be manually operated, and a movable member adapted to control the operation of said first brake shoe, said second brake shoe being free to move and controlled by the movement of the wheel, said second brake shoe controlling said member.

6. A brake, comprising a brake shoe adapted to be manually operated, a member having two independent movements and carrying a second brake shoe, means for manually controlling said member to force said second brake shoe into contact with the wheel whereby said member is displaced by the rotation of said wheel, and means controlled by said member for operating said second brake shoe.

7. A brake, comprising a brake shoe for engaging a wheel and adapted to be manually operated, a member carrying a second brake shoe for engaging a wheel, and means for manually displacing said member towards the wheel, said member being free to move in the plane of the wheel, and means controlled by the movement of said member to operate said first brake shoe.

8. A brake, comprising a brake shoe adapted to be manually operated, a pivoted lever, a member pivoted to said lever and free to move in the plane of the wheel to actuate said lever, said member carrying a second brake shoe, means for manually forcing said member towards the wheel to engage said second brake shoe with the wheel, and means controlled by said lever for operating said first brake shoe.

9. A brake, comprising a brake shoe adapted to be manually operated, a pivoted lever, a member pivoted to said lever and carrying a second brake shoe, a pull plate adapted to control said member, resilient means for holding said pull plate in a normal position, means for manually operating said pull plate to dispose said second brake shoe against the wheel, and means controlled by the movement of said lever for operating said first brake shoe.

10. A brake, comprising a hand brake shoe adapted to be manually operated, pivoted levers, members carrying brake shoes and pivoted to said lever, a link pivotally connecting said members, a pull plate slidably mounted upon said link, a spring adapted to hold said pull plate in a normal position, and means for manually displacing said pull plate against the tension of said spring to operate said brake shoes of said members, said members being free to move in the plane of rotation of the wheel, and means controlled by the movement of said levers for operating said hand-brake shoe.

11. A brake, comprising a hand-brake shoe adapted to be manually operated, pivoted levers, members carrying brake shoes and pivoted to said levers, a link pivotally connecting said members, a movable pull plate, said link being guided upon said pull plate and adapted to be displaced thereby, a spring holding said pull plate in a normal position, means for manually displacing said pull plate against the tension of said spring to operate said brake shoes of said members, said members being free to move in the plane of rotation of the wheel, flexible members having ends attached to one of said levers at opposite sides respectively of the pivot point of said lever and operating said hand-brake shoes when said lever is swung about its pivot, and links connecting said levers.

12. A brake, comprising a brake shoe adapted to be manually operated, a member carrying a second brake shoe, a lever, a flexible member secured to said lever and displacing said member to operate said second brake shoe through the movement of said lever, a toggle controlling said lever, means for manually operating said toggle, said member being free to move in the plane of the wheel, and means controlled by the movement of said member to operate said first brake shoe.

13. A brake, comprising hand brake shoes, an equalizer, a flexible member connecting said equalizer and said hand brake shoes, a second brake shoe adapted to be manually operated, said second brake shoe being free to move in the direction of rotation of the wheel, and means controlled by the movement of said second brake shoe to operate said flexible member to set said hand brake shoe.

14. A brake, comprising hand brake shoes, an equalizer, a flexible member connecting said equalizer and said hand brake shoes, a pivoted lever, a member pivoted to said lever and carrying a second brake shoe, a pull plate adapted to control said member, resilient means for holding said pull plate in a normal position, means for manually operating said pull plate to dispose said second brake shoe against the wheel, and means controlled by the movement of said lever for operating said flexible member to set said hand brake shoes.

In testimony whereof I have signed my name to this specification in the presence of two subscribing witnesses.

NICHOLAS J. CLUTE.

Witnesses:
 WALTER BRIGGS,
 MYRTLE E. BROOKS.